Feb. 28, 1939.  H A HALLUM  2,148,618
GAS PRESSURE REGULATOR
Filed Oct. 30, 1936
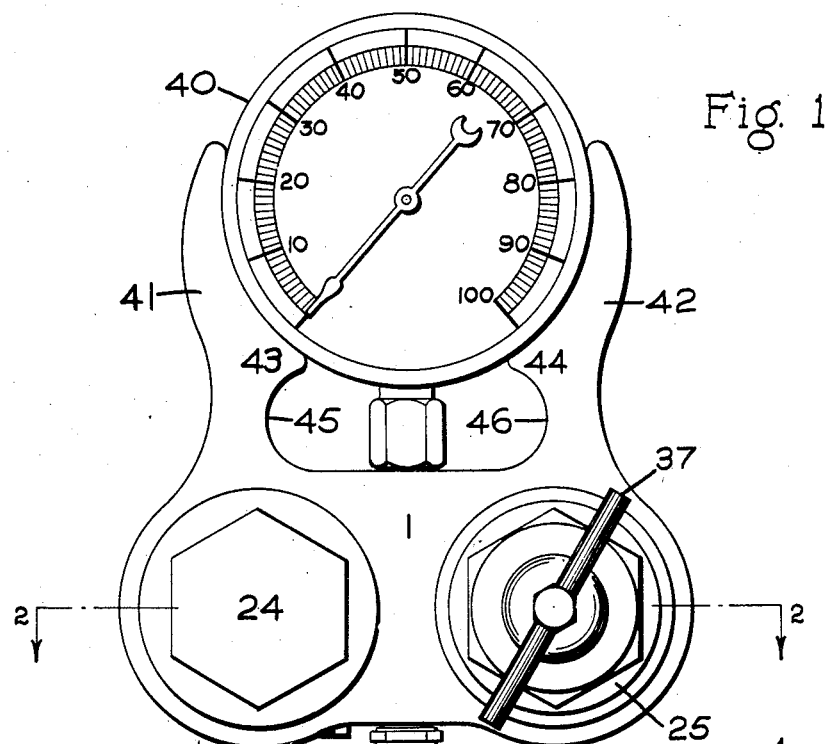
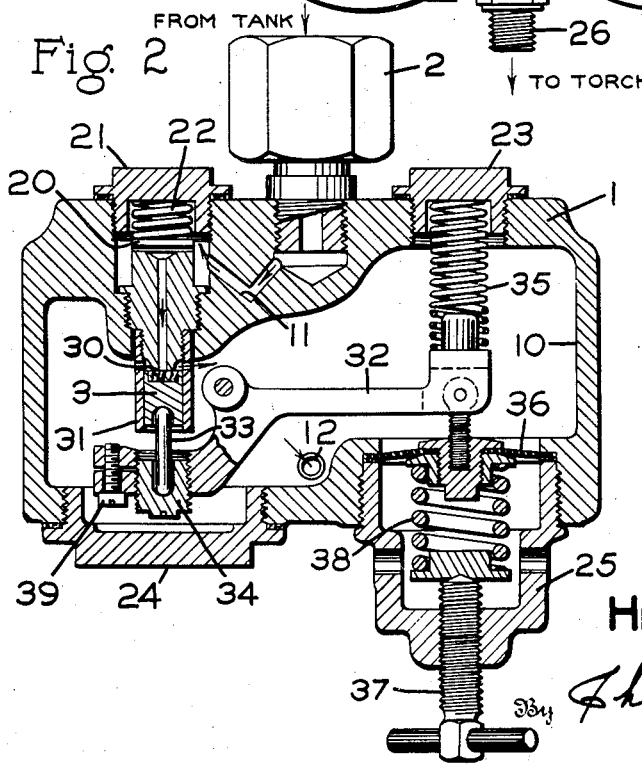
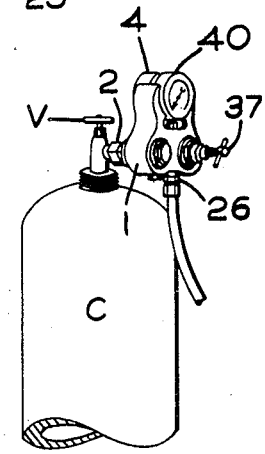
Inventor
HENRY A. HALLUM
By Charles L. Reynolds
Attorney Patented Feb. 28, 1939

2,148,618

UNITED STATES PATENT OFFICE 2,148,618

GAS PRESSURE REGULATOR

Henry A. Hallum, Seattle, Wash.

Application October 30, 1936, Serial No. 108,411

7 Claims. (Cl. 50—26)

My invention pertains to gas pressure regulators, such, for example, as might be used in gas welding or cutting equipment to regulate the pressure delivered to the torch, and to reduce the pressure from that carried in a supply cylinder to that desired for torch operation.

It is desirable in welding equipment of this type to employ a gauge which will indicate the pressure of the gas in the supply cylinder, so that the operator may know when his supply is nearing exhaustion, and a further gauge to indicate the pressure at which the gas is being supplied to the torch. Also proper pressure reduction and regulating mechanism must be provided so that the pressure delivered to the torch may be controlled by the operator, preferably with fine precision. The gauges customarily employed are rather expensive, and yet in equipment of conventional types these gauges are unprotected, and would usually be injured, for example, by having their stems broken off, in case the gas supply cylinder should accidentally fall over.

It is therefore an object of my invention to provide a gas pressure regulator which can be readily manipulated to adjust the pressure of the gas delivered with a high degree of precision. Such operation, however, is obtained by mechanism of a simple and rugged character, which will not readily get out of order or be subject to mechanical failure.

A further object is to provide a mount for the pressure gauge or gauges which will protect them from injury in case the gas supply cylinder should fall over, and which especially will prevent the gauge stems from being broken off, this being the most frequent type of damage to which the gauges have heretofore been subjected. This object is obtained while providing mechanism whereby the gauges may be easily mounted or dismounted, and which when in place are positioned for convenient reference thereto by the operator.

It is also an object of my invention so to form and assemble the entire regulator that the operative parts of the mechanism may be completely disassembled with the greatest facility. Furthermore, the construction is such that, for the most part, any particular element of the mechanism may be removed without removing other operative parts, and without disturbing the connections to the gauges, gas supply cylinder, or torch. Thus, for example, if the filter should become clogged, it alone can be removed and cleaned without affecting any other part of the mechanism or the connection of the regulator with the gas supply cylinder; or if the valve in the regulator should become stuck or otherwise out of order, or the seat or insert thereof need to be replaced, it may be removed without interfering with the operative relation of the remainder of the regulating mechanism.

Still a further object is to form the entire regulator with the parts arranged symmetrically about a vertical plane. Not only does this arrangement enhance the appearance of the regulator, but it provides a balance of the parts about the connection to the supply cylinder, so that the connection does not tend to unscrew, nor does it tend to become tighter, and in either case cause the gauges to tilt from their normally upright positions, so that they become more difficult to read at a glance.

Other objects of my invention inherent in the unique construction and arrangement of the parts which I employ will appear in the subsequent description.

More particularly my invention includes the gas pressure regulator shown in the drawing and described hereafter in the specification, with marked attention to the form and arrangement of the parts, the novel features of which are pointed out more specifically in the appended claims.

I have illustrated in the drawing a form of my regulator which I have found to be practical and which represents the construction which I now prefer, although for special installations certain variations within the scope of my invention will occur to those skilled in the art.

Figure 1 is a front elevation of my gas pressure regulator.

Figure 2 is a section taken along the line 2—2 of Figure 1.

Figure 3 is a perspective view of my device, shown as it would be mounted on a gas pressure cylinder in a typical installation.

My regulator includes a chambered body 1 in which the pressure reducing chamber is designated 10. The body 1 may be supported directly from a cylinder C containing gas under pressure, or an equivalent source, through a coupling 2 projecting laterally from and secured to the body at the entrance to a high pressure inlet 11 leading to the chamber 10.

Control of the flow of gas into the chamber 10 is maintained by valve means including a seat 3, which slides toward and from a nozzle 30 in a guide 31, which latter is preferably removably secured to the nozzle by screw threads, for example. The seat is urged towards the nozzle by pressure thereon of the short end of a lever 32 pivoted between its ends, exerted through an interengaged pin 33, received in a bushing 34 which is screwed into and clamped in the end of the lever. The lever 32 is urged to a position wherein it presses at the seat 3 by a spring 35 seating against the long end of the lever and reacting from the casing 1.

It is the usual practice to provide a diaphragm pressing against the movable seat or its equivalent on one side, and having a pressure regulating screw and spring engaged with the other side to vary the pressure of the seat on the nozzle. With such direct engagement a large diaphragm must be employed to compensate for fluctuations in the pressure of the gas within the pressure reducing chamber. In my device the utilization of such a large diaphragm becomes unnecessary, and in place thereof a comparatively small diaphragm 36 may be used in conjunction with a pressure regulating screw 37 and spring 38 interposed between the diaphragm and screw. Such a construction is possible because the lever 32 is proportioned so that its longer part is preferably four times the length of the shorter arm, and a mechanical advantage of four to one is thereby obtained. Hence a change in pressure per unit area of diaphragm will have four times as great an effect on the resistance of the seat 3 to movement as it would if the diaphragm 36 were directly coupled with the seat. Thus for the same sensitivity a diaphragm of only one-quarter the area would be required, but I prefer that the diaphragm be somewhat larger than one-quarter the conventional area in order that a more sensitive control over the valve movement and pressure may be exercised.

One of the most important features of my device is the arrangement which I employ to render all the operating parts individually accessible to the operator to as great an extent as possible, without disturbing either the mounting of the regulator or its connection to the torch. For example, a filter 20, preferably of the screen type, is located in the pressure inlet passage 11. Instead of being disposed immediately behind the coupling 2, so that the body would have to be disconnected from the cylinder and the coupling removed before the filter could be cleaned, I dispose the filter in a separate aperture in the body 1, which is closed by a cap 21 quite independent of the coupling 2. The filter 20 may be pressed firmly into place by a spring 22 engaged between the filter and the cap 21. Should the filter become clogged the regulator may remain supported on a gas pressure cylinder, as shown in Figure 3, if desired, and, after closing the tank valve V, the filter 20 may be removed through the aperture in the body 1, after merely taking off the cap 21 which closes the filter aperture. The filter may then be cleaned, replaced and the filter cap 21 reinserted in the aperture, all without disturbing any other operative part of the regulator, or interfering with its pressure source or torch connection.

A similar provision is made with respect to other parts, the spring 35, for example. This member may be removed from the body chamber 10 independently of all other parts through an aperture closed by a cap 23, in which the spring seats.

If the seat 3 should become stuck, or should fail to operate properly, or if the leather insert thereof should become worn, requiring replacing of the seat unit, it likewise may be removed with little difficulty and while substantially the entire remainder of the regulator remains intact with the parts in their operative relationship. To remove the seat it is merely necessary to unscrew the access cap 24 from the aperture in the body 1 which it closes, and to release the locking screw 39 and remove the adjusting screw 34 received in the short end of the lever 32. The pin 33, interengageable between the screw 34 and the seat 3, will then drop out and the seat 3 may thereupon be removed through the lever aperture from which the screw 34 has been removed, and through the aperture in the body closed by the access cap 24. It will be seen, therefore, that to remove the seat it is unnecessary to disturb in any way the operating lever 32, the regulating screw 37, or the diaphragm 36 and associated springs 35 and 38 controlling the longer lever arm.

Similar remarks apply to the removal of the regulating screw and its diaphragm. The cage 25, ported to the atmosphere, may be unscrewed for removal of the regulating screw 37 and spring 38. If the diaphragm 36, normally clamped between the cage 25 and the body 1, is also to be removed, it may be unscrewed from the bolt carried by the long lever arm, again without disturbing the operative relation of the remaining parts, such as the seat 3, pin 33, spring 35, and lever 32.

If, on the other hand, it is desired to entirely disassemble the mechanism within the chamber 10, this may be done with facility. The cap 23 may be removed for removal of the spring 35, the cage 25 is removed for removal of the regulating screw, diaphragm, and associated parts, and the seat and its operating lever 32 may be withdrawn through the access aperture opened by removal of the cap 24. As previously explained, the strainer or filter 20 will pass through the filter aperture upon removal of the cap 21. Thus all of the operative parts may be taken out of the casing or body 1 without disconnecting either the supporting and pressure supply coupling 2 from a pressure cylinder or other source, or the torch connection to the coupling 26, communicating with the low pressure outlet 12 from the chamber 10. Adjustment, repair or replacement of parts of the operating mechanism may therefore be made with the least possible delay and inconvenience, and the only tools required are a wrench and a screw driver, which are always available on the job.

During the operation of a torch the operator should know the gas pressure being delivered to the torch, and as well should be able to ascertain how much gas is left in his supply source. Since pressure gauges used for this purpose are expensive, I have provided means for protecting them from breakage, for example, in case the supply cylinder C should be inadvertently tipped over. Normally a high pressure gauge 4, indicating the pressure in the cylinder, is employed in conjunction with a low pressure gauge 40, to indicate the working pressure of the torch. To support these gauges I have provided arms 41 and 42 extending upward from the body 1 and having inwardly facing, concave surfaces complemental to the curvature of the gauges. Between these arms the gauges are supported back to back, so that the high pressure gauge 4 will face the valve handle V of the shut-off valve for the pressure cylinder C. As the operator turns on the gas through this valve he may conveniently watch the gauge 4, since it faces the handle, and by its indication he will be apprised of the amount of cylinder pressure indicating the amount of gas remaining in such cylinder.

When the gas has been turned on, the operator will usually work on the side of the regulator remote from the cylinder in performing a welding or cutting operation. Having ascertained by the gauge 4 that the supply is adequate for his purpose he need not again refer to the cylinder pressure, but only regulate his torch pressure. Consequently the gauge 40, indicating the operating pressure of the torch, is mounted to face away from the cylinder C and toward the operator, and the gauge 4 is hidden from view so that its reading will not confuse him. The high pressure gauge 4, of course, communicates with the high pressure inlet 11, which is directly connected through the coupling 2 with the pressure source, and the low pressure gauge 40 communicates with the low pressure chamber 10.

The particular mechanism which I have shown for supporting the gauges 4 and 40 are shoulders 43 and 44, formed on the arms 41 and 42, respectively, to engage beneath the gauges. The high pressure connection is disposed at one end of the valley between the arms 40 and 41, and the low pressure connection is at the other end of this valley. The arms are of a width sufficient to engage at least partially the peripheries of both gauges, as shown in Figure 3. The gauges may easily be coupled, since the arms 41 and 42 are provided with reentrant portions 45 and 46, respectively beneath the shoulders 43 and 44, for insertion of a wrench or the operator's fingers along each side of the gauge couplings, between them and the upwardly extending arms.

In order to give to my complete regulator assembly the proper balance and convenience of arrangement of parts I prefer that the body 1 and the arms 41 and 42 be arranged symmetrically about a vertical plane transversely therethrough and bisecting the coupling 2. With such a balanced device there is no tendency of the gauges, mounted on top of the body, to turn from their precisely vertical positions wherein the plane of symmetry passes diametrically through them. Thus the arms 41 and 42 are arranged symmetrically in corresponding positions on each side of this plane of symmetry. The inlet coupling 2 and the outlet coupling 26 are bisected by such planes. On one face the filter cap 21 and spring backing cap 23 are disposed symmetrically on opposite sides of the plane of symmetry, and are themselves of similar size and shape, so that the same tool may be used to remove both and so that one will in effect balance the other. On the opposite face the cap 24 and cage 25 are located in corresponding positions on opposite sides of the plane of symmetry. Again these two members are of similar size and shape, so that they may be removed by the same tool and will tend to balance the regulator.

It will thus be seen that my regulator is of very simple construction, but the parts thereof are so formed and arranged that very accurate and reliable operation may be obtained with great ease and with little upkeep or attention being required.

What I claim as my invention is:

1. A gas pressure regulator comprising a chambered body having four apertures, of which two are in one face and two in an opposite face, and each of the latter aligned with one of the first, caps closing three of said apertures and a diaphragm closing the fourth, said body having also a high pressure inlet to said chamber and a low pressure outlet therefrom, a lever within said chamber, pivoted between its ends to provide a long and a short end, the long end being disposed adjacent and operatively connected to said diaphragm, a nozzle between the inlet and said chamber removable upon removal of a cap adjacent the opposite end of the lever, a seat normally seating thereon and operatively engaged with the latter end of the lever, and removable with the lever in its normal position, upon removal of a second, adjacent cap, a spring opposing said diaphragm and removable upon removal of the third cap, a spring backing the diaphragm, a cage received in the diaphragm opening, the latter spring reacting between said cage and the diaphragm, and opposing the first spring, and being removable by removal of the cage, and an adjusting screw threaded in the cage for regulating the force of the latter spring.

2. A gas pressure regulator comprising a chambered body having a high pressure inlet and a low pressure outlet, and shaped symmetrically about a vertical plane extending transversely therethrough, a nozzle and a seat engageable therewith to close the nozzle, both in the chamber, a screen filter interposed between the inlet and the nozzle and seat, a spring urging said seat to engagement with the nozzle, a pressure regulating screw to force said seat away from the nozzle against the action of said spring, a screen filter cap giving access to said filter and located on one face of said body at one side of said plane, a backing cap for said spring disposed on the same face of said body and at the opposite side of said plane, a pressure regulating screw cap on the other face of the body disposed at one side of said plane, and an access cap for access to parts in the chamber, disposed on the same body face but at the opposite side of said plane, all said caps being independent of the inlet and outlet.

3. A gas pressure regulator comprising a chambered body disposed at opposite sides of a vertical plane extending transversely through the body, and having a high pressure inlet connection and a low pressure outlet connection located in said plane, a filter for said inlet received in an aperture in said body at one side of said plane and communicating therewith, a filter cap for such aperture, a spring backing cap, received in an aperture in said body communicating with the chamber and at the side of said plane opposite said filter cap aperture, a nozzle within said body at the discharge side of said filter, a seat movable to seat upon the outlet of the nozzle, a lever in the chamber pivoted between its ends to provide a long and a short end and having its short end engaging said seat, a spring movable through the spring backing cap aperture, and normally interposed between the backing cap and the long end of said lever to urge the seat against the nozzle outlet, an access cap received in an aperture in said body on the side opposite said spring backing cap and disposed at the same side of said plane as said filter cap aperture, said lever and said seat being removable through said access cap aperture, a regulating screw cap received in an aperture in the same side of said body as said access cap, but on the opposite side of said plane, a diaphragm of comparatively small size held by said regulating screw cap in and closing the regulating screw cap aperture, a member interengaged between said diaphragm and the long end of said lever, a regulating screw threaded in said regulating screw cap, and a spring interposed between said regulating screw and said diaphragm.

4. A gas pressure regulator comprising a chambered body disposed at opposite sides of a vertical plane extending transversely through said body, and having a high pressure inlet connection and a low pressure outlet connection both disposed in said plane, a filter for said inlet received in an aperture in said body at one side of said plane and communicating with said inlet, a filter cap for such aperture, a spring backing cap received in an aperture in said body communicating with the chamber and at the side of said plane opposite said filter cap aperture, a nozzle within said body at the discharge side of said filter, a seat movable to seat upon the outlet of the nozzle, a lever in the chamber pivoted between its ends, to provide a long and a short end, an adjusting screw threaded in its short end, and operatively engaged with said seat, a spring movable through the spring backing cap aperture and normally interposed between the backing cap and the long end of said lever to urge the seat against the nozzle outlet, an access cap received in an aperture in said body on the side opposite said filter cap aperture and disposed at the same side of said plane as said filter cap aperture, said adjusting screw being adjustable, and said lever and said seat being each independently removable through said access cap aperture, a regulating screw cap received in an aperture in the same side of said body as the access cap, but on the opposite side of said plane, a diaphragm of comparatively small size held by said regulating screw cap in and closing the regulating screw cap aperture, a member interengaged between said diaphragm and the long end of said lever, a regulating screw threaded in said regulating screw cap, and a spring interposed between said regulating screw and said diaphragm.

5. A gas pressure regulator comprising a chambered body of elongated form, having an inlet connection from a high pressure source and a low pressure outlet connection both disposed intermediate its ends, and having in addition four apertures, two in each of two opposite faces, and at opposite sides of the inlet and outlet connections, and each aligned with an aperture in the opposite face, a lever disposed lengthwise within the chamber, a nozzle secured within and discharging into the chamber, and accessible through a first such aperture, a cap closing such aperture behind the nozzle, and spaced from the latter, the body having a port affording communication between the inlet connection and the space between the nozzle and the cap, a seat movable within the chamber and cooperating with the nozzle to control discharge of gas from the latter, the lever having a hole in alignment with the seat, and larger than the seat, an adjusting screw threaded in said hole in the lever and accessible through a second aperture, aligned with that closed by said cap, whereby the seat may be removed through the second aperture after removal of the adjusting screw, a cap closing the second aperture, an operative connection between the adjusting screw and the seat to control movement of the latter, a spring engaging the lever, distant from the seat, and urging the latter towards the nozzle, a cap closing a third aperture in the body and affording a seat for said spring, and enabling removal of the spring, a diaphragm closing a fourth aperture, aligned with the third aperture and operatively connected to the lever, and a regulating screw and spring received in the fourth aperture, and opposing the first-mentioned spring.

6. A gas pressure regulator comprising a chambered body of elongated form, having an inlet connection from a high pressure source and a low pressure outlet connection both disposed intermediate its ends, and having in addition four apertures, two in each of two opposite faces, and at opposite sides of the inlet and outlet connections, and each aligned with an aperture in the opposite face, a lever disposed lengthwise within the chamber, a nozzle secured within and discharging into the chamber, and accessible through a first such aperture, a cap closing such aperture behind the nozzle, and spaced from the latter, the body having a port affording communication between the inlet connection and the space between the nozzle and the cap, a seat movable within the chamber and cooperating with the nozzle to control discharge of gas from the latter, a guide for said seat threaded on the nozzle, and removable with the latter through the first aperture, the lever having a hole in alignment with the seat, and larger than the seat, an adjusting screw threaded in said hole in the lever and accessible through a second aperture, aligned with that closed by said cap, whereby the seat may be removed through the second aperture after removal of the adjusting screw, a cap closing the second aperture, an operative connection between the adjusting screw and the seat, to control movement of the latter, a spring engaging the lever, distant from the seat, and urging the latter towards the nozzle, a cap closing a third aperture in the body and affording a seat for said spring, and enabling removal of the spring, a diaphragm closing a fourth aperture, alined with the third aperture and operatively connected to the lever, and a regulating screw and spring received in the fourth aperture, and opposing the first-mentioned spring.

7. A gas pressure regulator comprising a chambered body of elongated form, having two apertures in the opposite walls at one end and two other apertures in the opposite walls at the other end, and having in addition a high pressure inlet and a low pressure outlet, a lever disposed lengthwise of the chamber, a spring-pressed diaphragm closing one aperture, and acting upon one side of one end of the lever, an opposing spring acting upon the opposite side of the same end of the lever, insertable through the corresponding aperture, and a plug closing such aperture, the resultant of the opposed spring forces tending to swing the opposite end of the lever towards one of the apertures at such end of the chamber, a nozzle mounted in the latter aperture, and a valve seat guided for movement in the chamber to seat on such nozzle, said nozzle and seat governing entrance of gas from the inlet into the chamber, a valve-seat-engaging member carried on the last-mentioned end of the lever, and movable under the influence of the resultant spring force to close the nozzle, and a plug closing each of the apertures at such end of the chamber, and upon their removal affording access, the one to the valve seat and valve-seat-engaging member, and the other to the nozzle.

HENRY A. HALLUM.